United States Patent [19]

Maeda

[11] 4,410,969
[45] Oct. 18, 1983

[54] OPTICAL INFORMATION PLAYBACK APPARATUS

[75] Inventor: Takeshi Maeda, Kokubunji, Japan

[73] Assignee: Hitachi, Ltd., Tokyo, Japan

[21] Appl. No.: 217,024

[22] Filed: Dec. 16, 1980

[30] Foreign Application Priority Data

Dec. 19, 1979 [JP] Japan .................. 54-164044

[51] Int. Cl.³ .................................. G11B 7/12
[52] U.S. Cl. .................................. 369/46; 369/45; 369/109; 369/112
[58] Field of Search .......... 358/128.5, 128.6, 342; 369/44, 45, 46, 111, 112, 118, 124; 250/201, 202, 203, 204, 570

[56] References Cited

U.S. PATENT DOCUMENTS

| | | | |
|---|---|---|---|
| 4,001,494 | 1/1977 | Adler et al. | 369/46 |
| 4,065,786 | 12/1977 | Stewart | 369/46 |
| 4,123,652 | 10/1978 | Bouwhuis | 250/204 |
| 4,163,149 | 7/1979 | Sawano et al. | 250/204 |
| 4,268,745 | 5/1981 | Okano | 369/44 |
| 4,273,998 | 6/1981 | Kanamaru | 250/204 |
| 4,290,132 | 9/1981 | Kotaka | 369/45 |
| 4,293,944 | 10/1981 | Izumita et al. | 369/45 |

FOREIGN PATENT DOCUMENTS

| | | | |
|---|---|---|---|
| 52-73702 | 6/1977 | Japan | 369/45 |
| 53-19806 | 2/1978 | Japan | 369/45 |
| 53-19807 | 2/1978 | Japan | 369/45 |
| 53-20303 | 2/1978 | Japan | 369/45 |

*Primary Examiner*—Bernard Konick
*Assistant Examiner*—Donald McElheny, Jr.
*Attorney, Agent, or Firm*—Antonelli, Terry & Wands

[57] ABSTRACT

An optical information playback apparatus comprises a light detector having a light receiving area divided into four sections by transverse axes and an optical system having a cylindrical lens arranged with its axis taken at about a 45° angle to a direction of an information track of an optical disk to direct a reflected light from the optical disk to the light detector. A difference signal between outputs from the light receiving sections on the opposite sides of the axis parallel to an information track of the optical disk and the axis transverse to the information track, respectively, is produced for use as a focusing signal and as a tracking signal for tracking the information track with the tracking signal having an improved S/N ratio.

7 Claims, 10 Drawing Figures

$|\tilde{a}|<|\tilde{b}|$ ———
$|\tilde{a}|>|\tilde{b}|$ - - -
$|\tilde{a}|=|\tilde{b}|$ — · —

OPTICAL INFORMATION PLAYBACK APPARATUS

BACKGROUND OF THE INVENTION

1. Field of the Invention

The present invention relates to an optical information playback apparatus, and more particularly to an apparatus for playing back information from a so-called optical disk.

2. Description of the Prior Art

An apparatus has been proposed in which a guide groove is formed on an optical disk and information to be additionally recorded is recorded by tracking a light spot along the guide groove while modulating a light intensity of the light spot. One example thereof is an apparatus disclosed in Japanese Patent Application Laid-Open (Kokai) No. 130102/79, in which the guide groove is of phase type having a groove depth of $\lambda/8$ (where $\lambda$ is a wavelength of a playback laser beam). The additional information is recorded in intensity type in which pits are formed in a metal thin film vapor-deposited on the surface of the disk.

In such a prior art apparatus, auto-focusing means for focusing the laser beam onto the disk and tracking means for controlling the position of a converging point (spot) of the laser beam such that the laser beam tracks a desired groove on the disk are required. Apparatus which meet the above requirements are illustrated in FIGS. 1 and 2. In FIG. 1, a laser beam 2 emitted from a laser light source 1 passes through a beam splitter 3, a light deflector 20 and a converging lens 4 and then it is focused onto a track 5 of an optical disk 6 (only a portion of which is shown in FIG. 1). A reflected laser beam passes through the converging lens 4 and the light deflector 20 and then it is directed to a unidirectional lens 7 such as a cylindrical lens by the beam splitter 3. The cylindrical lens 7 is arranged with an angle of approximately 45 degrees with respect to the direction of the track, that is, y-direction in FIG. 1. Similarly, a light detector 11 (to which light transmitted through the cylindrical lens 7 is directed) is arranged such that one of border lines 1 and 1' (that is, orthogonal axes which divide a light receiving surface into four sections) on the light receiving surface is in parallel to the y-direction as shown in FIG. 2. With this arrangement, if the depth of the pit deviates from one quarter of a wavelength of the playback laser beam, the distribution of the reflected light at the track is asymmetric around the track and an effect thereof does not reflect to a focusing signal.

In FIG. 2, the focusing signal is produced as a result of a change in the distribution on the light receiving surface (divided into four sections) of the light detector 11 for detecting off-focusing as shown by a broken line in FIG. 2. That is, it is produced based on a difference signal (at a subtractor 14) between a sum signal (at an adder 12) of outputs from the light receiving surface sections 11a and 11b, and a sum signal (at an adder 13) of outputs from the light receiving surface sections 11c and 11d. The difference signal is applied to a voice coil 4 to effect autofocusing. On the other hand, the tracking signal is produced based on a difference signal (at a subtractor 18) between a sum signal (at an adder 28) of outputs of the light receiving surface sections 11a and 11d, and a sum signal (at an adder 29) of outputs from the light receiving surface sections 11b and 11c. The resulting difference signal represents the off-track signal due to the distribution of the defracted light. In FIG. 2, numerals 12, 13, 28 and 29 denote the adders, 14 and 18 denote the differential amplifiers, 15 denotes a phase compensator, 19 denotes a light deflection drive circuit, and 20 denotes a tracking deflector.

The method of deriving the tracking signal in this manner has a disadvantage of a low S/N ratio.

SUMMARY OF THE INVENTION

It is an object of the present invention to provide an optical information playback apparatus capable of correctly detecting an off-focusing signal.

It is another object of the present invention to provide an optical information playback apparatus capable of producing a tracking signal with a high S/N ratio.

In order to attain the above objects, the optical information playback apparatus of the present invention is characterized by using a difference signal between outputs of light receiving surface sections arranged symmetrically relative to a direction normal to the direction of track, as the tracking signal, when the tracking signal is to be detected from a change in a distribution pattern of diffracted light over a light detector having the four-divided light receiving surface sections.

The present invention is now explained in detail with reference to the accompanying drawings.

DESCRIPTION OF THE PREFERRED EMBODIMENTS

A principle of the present invention is first explained.

Figure 1:
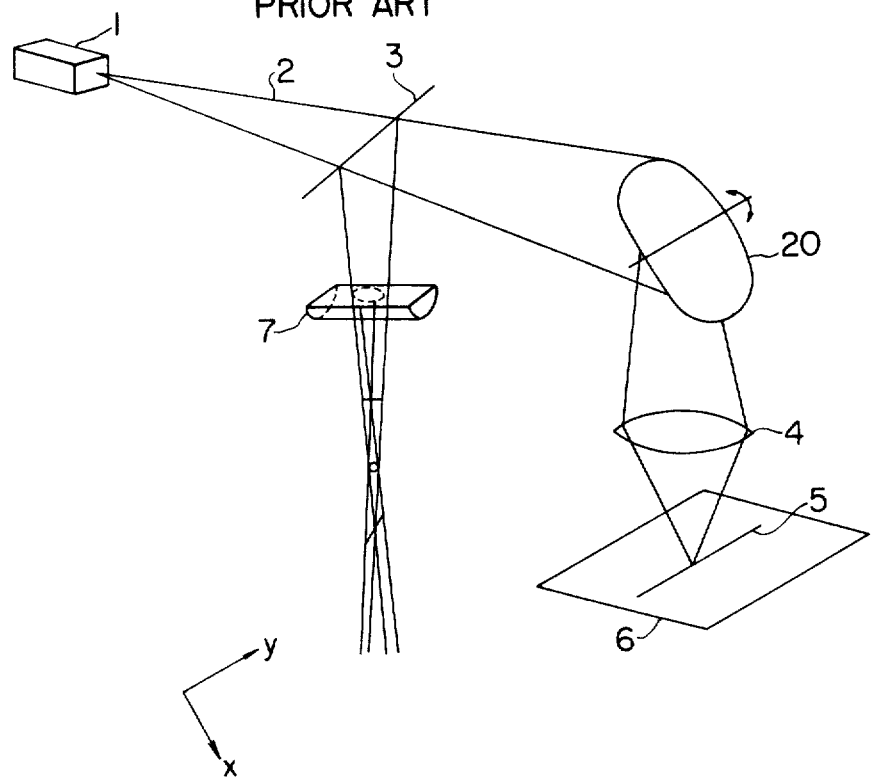
FIG. 1 illustrates a principle of auto-focusing.
Figure 3:
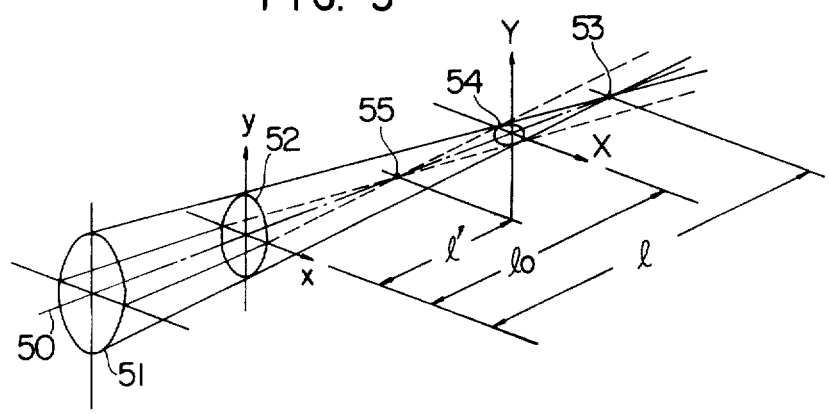
FIGS. 3 and 4a–4d show beam pattern diagrams for illustrating a principle of the present invention.

FIG. 3 shows a positional relationship of a light detector, a cylindrical lens and an object lens. Numeral 50 denotes an optical axis of an optical system, 51 denotes a light emitting aperture of the object lens, and 52 denotes a light emitting aperture of the cylindrical lens. Numeral 55 denotes a focusing point in a focusing direction of the cylindrical lens, and 53 denotes a focusing point of the object lens. A distance from the light emitting aperture of the cylindrical lens to the light detector 54 is represented by $l_o$, a distance to the focusing point 55 of the cylindrical lens is represented by $l'$, and a distance to the focusing point 53 of the object lens is represented by $l$. An x-y coordinate is defined in a plane on the light emitting aperture of the cylindrical lens. An X-Y coordinate is defined on a surface of the light detector 54. The following relations exist between x and X, and y and Y.

$$X = \tilde{a}x \tag{1}$$

$$Y = -\tilde{b}y \tag{2}$$

$$\tilde{a} = \frac{l - l_o}{l} \tag{3}$$

$$\tilde{b} = \frac{l_o - l'}{l'} \tag{4}$$

A point (x, y) on the light emitting aperture of the cylindrical lens is projected at a point (X, Y) after the conversions in accordance with the formulas (1) and (2).

Figure 4A:
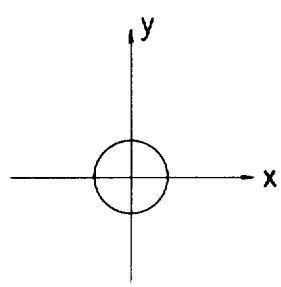
Figure 4B:
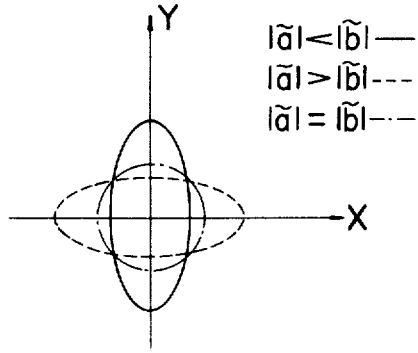
Figure 4C:
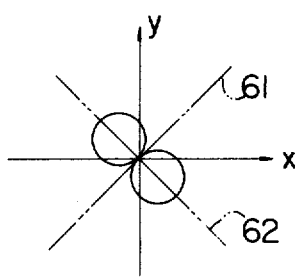
Figure 4D:
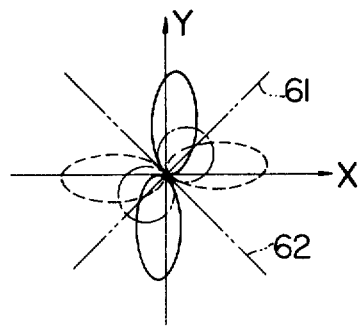

FIGS. 4a–4d show the manners of projection. A circle as shown in FIG. 4a or the x-y plane appears as an ellipse or a circle on the X-Y plane as shown in FIG. 4b depending on the relative magnitudes of $|\tilde{a}|$ and $|\tilde{b}|$. This fact is utilized in the off-focus detection. Two circles which are symmetric relative to axes 61 and 62 which are angled by 45 degrees with respect to the x and y axes, respectively, on the x-y plane as shown in FIG. 4c appear as shown in FIG. 4d on the X-Y plane in accordance with the formulas (1) and (2) depending on the relative magnitudes of $|\tilde{a}|$ and $|\tilde{b}|$.

The relative magnitudes of $|\tilde{a}|$ and $|\tilde{b}|$ change depending on the location at which the light detector is mounted. If it is closer to the focusing point 55, $|\tilde{a}|$ is smaller than $|\tilde{b}|$ (as shown by solid lines in FIGS. 4b and 4d), if it is closer to the focusing point 53, $|\tilde{a}|$ is larger than $|\tilde{b}|$ (as shown by broken lines in FIGS. 4b and 4d), and if it is at a point between the focusing point 55 and the light emitting aperture 52, $|\tilde{a}|$ is equal to $|\tilde{b}|$ (as shown by single-dot chain lines in FIGS. 4b and 4d).

The cylindrical lens is angled by 45 degrees to the direction of track. When the direction of track is in line with the axis 61 shown in FIG. 4c, a distribution pattern of the diffracted light has two circles on the x-y plane as shown in FIG. 4c.

Figure 5A:
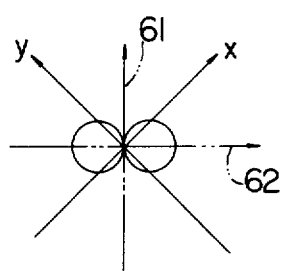
FIGS. 5a and 5b illustrate a relationship between a beam pattern and a light detector.
Figure 5B:
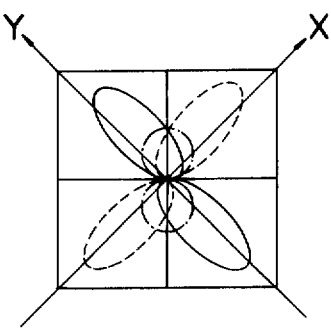

FIGS. 5a and 5b show the changes in beam patterns on the x-y plane and the X-Y plane when the cylindrical lens is angled by 45 degrees to the direction of track, and FIG. 5b particularly shows a relationship between the light detector having the four-divided light receiving surface and the pattern of the diffracted light when it passes through the track. In order to correctly detect the off-focus signal, it is necessary to arrange the light detector at a position which assures the relation of $|\tilde{a}| = |\tilde{b}|$ at a best focus position. At this time the distribution of the diffracted light on the light detector appears as shown by a single-dot chain line in FIG. 5b. Thus, a difference signal from the light detector which is arranged symmetrically to the direction normal to the track produces the tracking signal with a high S/N ratio.

Figure 2:
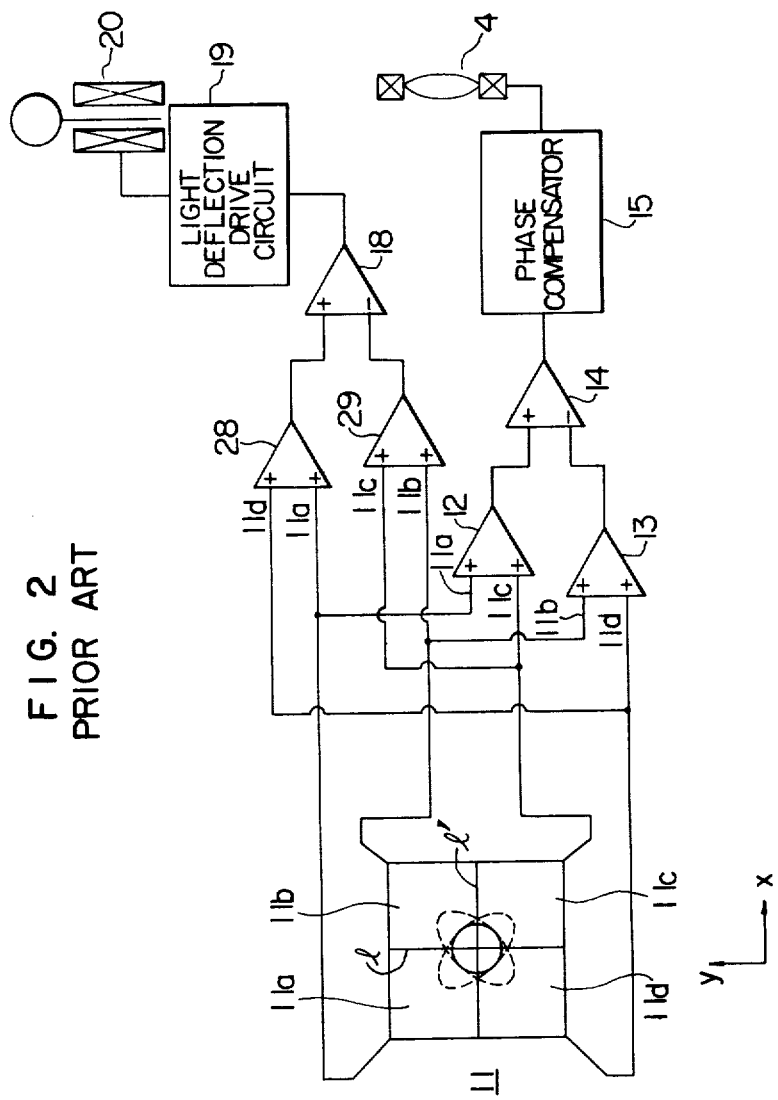
FIG. 2 shows a block diagram of a prior art apparatus for effecting auto-focusing and tracking.
Figure 6:
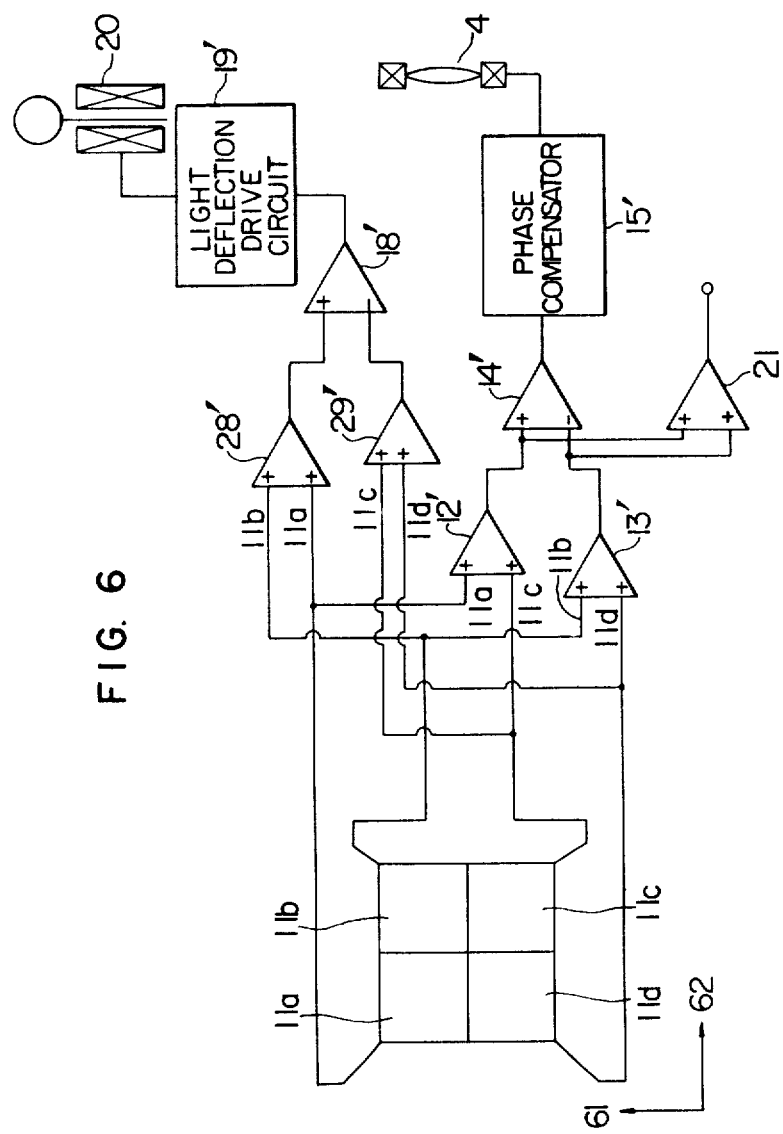
FIG. 6 shows a block diagram of a configuration of one embodiment of the present invention.

The present invention is now explained with reference to a preferred embodiment shown in FIG. 6, in which the like reference numerals to those shown in FIG. 2 denote the identical or equivalent elements. The dividing lines of the light detector which define four light receiving sections 11a, 11b, 11c and 11d are parallel to the axes 61 and 62, respectively. The direction of track is in line with the axis 61. The cylindrical lens (not shown in FIG. 6) is angled by 45 degrees to the axes 61 and 62. The off-focus signal is produced by applying the output signals from the light receiving sections 11a and 11c (which are on opposite sides of the axis 61 and not adjacent to each other) to an adder 12', applying the output signals from the light receiving sections 11b and 11d (which are on opposite sides of the axis 61 and not adjacent to each other) to an adder 13' and applying the output signals from the adders 12' and 13' to a differential amplifier 14', which in turn produces the off-focus signal. This signal is applied to a phase compensator 15' to drive the voice coil 4.

On the other hand, as described above, the distribution pattern of the tracking signal is symmetric relative to the axis 62 which is at right angle to the axis 61 which is parallel to the direction of the track. Accordingly, the tracking signal is produced by applying the output signals from the light receiving sections 11a and 11b to an adder 28', applying the output signals from the light receiving sections 11d and 11c to an adder 29' and applying the output signals from the adders 28' and 29' to a differential amplifier 18' to produce a difference therebetween. This difference signal having a high S/N ratio is applied to a light deflection circuit 19', which drives the light deflector 20 to effect tracking.

The detection of information signals from the pits recorded on the disk may be carried out by combining the output signals from the light receiving sections 11a, 11b, 11c and 11d by an adder 21. Alternatively, it may be carried out by the use of unbalance of the diffracted light in the direction of the track. More particularly, by the use of unbalance of the diffracted light in the direction tangential to the rotation of the disk on which the pits are recorded, a sum signal of the outputs from the light receiving sections 11a and 11d is produced in an adder, a sum signal of the outputs from the light receiving sections 11b and 11c is produced in an adder and a difference signal between those sum signals is produced in a subtractor.

The means driven by the tracking signal includes the light deflector (galvano mirror, A/O deflector, etc.) or any other device which effectively moves the light spot. As an example, means for moving the entire optical system such as a swing arm (used in a magnetic disk device) or a linear motor may be used.

I claim:

1. An optical information playback apparatus comprising a laser beam source, an information record medium having tracks of information stored therein, first optical means for directing a laser beam from said laser beam source onto a track of said information record medium, light detection means for detecting a laser beam derived from said information track, second optical means for directing the laser beam derived from said information track to said light detecting means through an optical element having a unidirectional lens function, and first and second control means responsive to an output of said light detecting means for controlling the position of said first optical means such that said laser beam is focused onto said record medium and said laser beam tracks said information track, said optical element being arranged such that an optical axis thereof makes an angle of approximately 45 degrees with the direction of said information track, said light receiving sections arranged symmetrically to axes transverse to each other, one of said axes being in parallel to the direction of said information track, means for providing a differential signal between sum signals of outputs from the light receiving sections on opposite sides of the axis traverse to the direction of said information track, said second control means receiving said differential signal for effecting control in accordance therewith.

2. An optical information playback apparatus according to claim 1, further comprising first adder means for providing a sum signal of outputs from said light receiving sections arranged on one side of the axis transverse to the direction of said information track and a second adder means for providing a sum signal of outputs from said light receiving sections arranged on the other side of the axis transverse to the direction of said information track, said differential signal means providing a difference signal between the sum signals from said first and second adder means, and said second control means being responsive to said difference signal from said differential signal means.

3. An optical information playback apparatus according to claim 1, wherein said light detecting means is arranged between the focusing points of said first and second optical means so that the relative magnitude of $|\tilde{a}|$ and $|\tilde{b}|$ are equal in accordance with the following relationships:

$$X = \tilde{a}x;$$

$$Y = \tilde{b}y;$$

$$\tilde{a} = \frac{l - l_o}{l};$$

$$\tilde{b} = \frac{l_o - l'}{l'};$$

where x and y are coordinates defined in a plane on a light emitting aperture of said optical element, X and Y are coordinates defined on a surface of said light detecting means, $l_o$ is a distance from the light emitting aperture of said optical element to said light detecting means, $l'$ is the distance from the light emitting aperture of said optical element to the focusing point of said optical element, and l is a distance from the light emitting aperture of said optical element to focusing point of said first optical means.

4. An optical information playback apparatus comprising a laser beam source, an information record medium having tracks of information stored therein, first optical means for directing a laser beam from said laser beam source onto a track of said information recordiang medium, light detection means for detecting a laser beam derived from said information track, second optical means for directing the laser beam derived from said information track to said light detecting means through a cylindrical lens having a unidirectional lens function, differentiation means responsive to the output of said light detecting means for producing a differential signal, and focusing control means and tracking control means for controlling the position of said first optical means in response to the output of said differentiation means for at least controlling the position of said first optical means such that the laser beam is focused onto said recording medium and the laser beam tracks said information track, said cylindrical lens being arranged such that an axial line of said cylindrical lens orthogonal to the end surfaces thereof makes an angle of approximately 45° with the direction of said information track in the plane of a projection of said record medium through said second optical means, said light detection means including at least four light receiving sections arranged symmetrically to axes orthogonal to each other, one of said axes being in parallel to the direction of said projected information track, said differentiation means producing at least a differential signal between a sum signal of outputs from said light receiving sections arranged on one side of the other axis which is orthogonal to the axis parallel to the direction of said projected information track and a sum signal of outputs from said light receiving sections arranged on the other side of the other axis, said tracking control means being responsive to the output of said differential signal producing means for effecting tracking control in accordance therewith.

5. An optical information playback apparatus according to claim 4, wherein the number of said light receiving sections is four, said differentiation means producing another differential signal between a sum of outputs from two non-adjacent light receiving sections and a sum of outputs of the other two non-adjacent light receiving sections, said focusing control means being responsive to said another differential signal for effecting focusing control in accordance therewith.

6. An optical information playback apparatus according to claim 1, 4 or 5, further comprising means for producing a sum signal of outputs from all of said light receiving sections, said sum signal being utilized as an information signal.

7. An optical information playback apparatus according to claim 4, wherein said light detecting means is arranged between the focusing points of said first and second optical means so that the relative magnitudes of $|\tilde{a}|$ and $|\tilde{b}|$ are equal in accordance with the following relationships:

$$X = \tilde{a}x;$$

$$Y = \tilde{b}y;$$

$$\tilde{a} = \frac{l - l_o}{l}$$

$$\tilde{b} = \frac{l_o - l'}{l'}$$

where x and y are coordinates defined in a plane on a light emitting aperture of said cylindrical lens; X and Y are coordinates defined on a surface of said light detecting means, $l_o$ is a distance from the light emitting aperture of said cylindrical lens to said light detecting means, $l'$ is the distance from the light emitting aperture of said cylindrical lens to the focusing point of said cylindrical lens, and l is a distance from the light emitting aperture of said cylindrical lens to the focusing point of said first optical means.

* * * * *